United States Patent [19]

Shirako

[11] Patent Number: 4,479,580

[45] Date of Patent: Oct. 30, 1984

[54] CASING FOR RECEIVING CASSETTE

[75] Inventor: Hideo Shirako, Tokyo, Japan

[73] Assignee: Olympus Optical Company Limited, Tokyo, Japan

[21] Appl. No.: 478,164

[22] Filed: Mar. 23, 1983

[30] Foreign Application Priority Data

Mar. 24, 1982 [JP] Japan ............................ 57-41524[U]

[51] Int. Cl.³ ............................................ B65D 85/672

[52] U.S. Cl. .................................... 206/387; 206/389; 206/493

[58] Field of Search ................ 206/387, 389, 398, 493

[56] References Cited

U.S. PATENT DOCUMENTS 3,272,325 9/1966 Schoenmakers .................... 206/387
3,620,361 11/1971 Fugiwara et al. ................... 206/387
4,026,615 5/1977 Tazaki et al. ....................... 206/387
4,119,200 10/1978 Cassidy et al. ...................... 206/387
4,196,806 4/1980 Posso .................................. 206/387

FOREIGN PATENT DOCUMENTS 2330631 1/1974 Fed. Rep. of Germany ...... 206/387

*Primary Examiner*—George E. Lowrance
*Assistant Examiner*—Jimmy G. Foster
*Attorney, Agent, or Firm*—Toren, McGeady and Stanger

[57] ABSTRACT

A casing for receiving a cassette is including a casing body for receiving a tape cassette, the casing body having a rectangular opening, a lid member attached to the minor side of the opening and capable of being opened and closed, and a pair of engaging members provided to the lid and arranged at the same plane as the opening and closing direction of the lid and for regulating the position of reel hubs which are rotatably mounted to the cassette. The engaging member has a slanted portion provided at the opposite position of the tip thereof and for making the central axis of the reel hub eccentric, and a notched portion provided at the opposite position to the slanted portion and for preventing engagement to projections which are formed at the inner peripheral surface of the reel hub.

2 Claims, 7 Drawing Figures

12 16a 13 14 17a 15 17 A 18 16 13b 13a 11 14a 14b 18

FIG_3
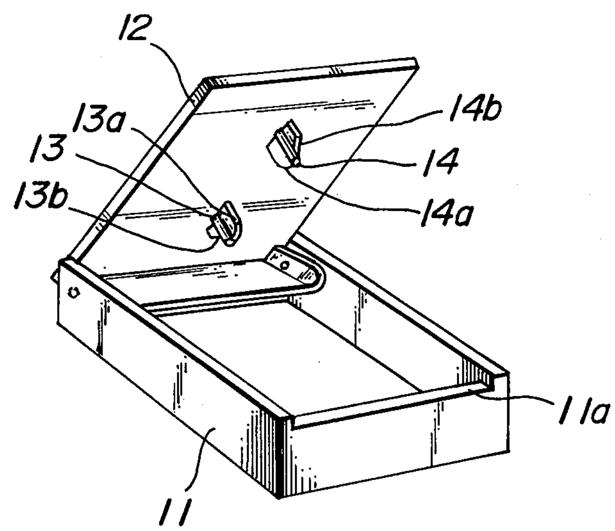
FIG_4
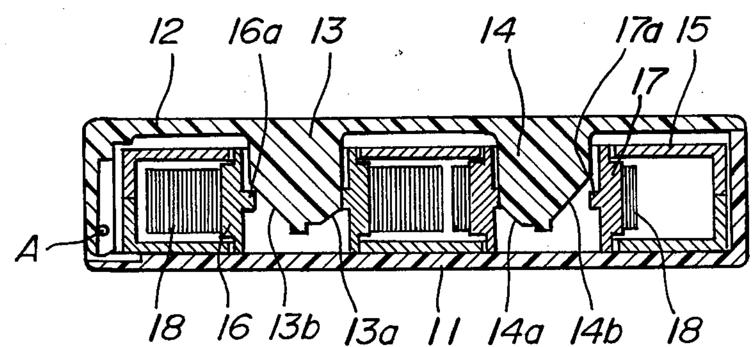

CASING FOR RECEIVING CASSETTE

BACKGROUND OF THE INVENTION

The present invention relates to a casing for receiving or accommodating tape cassette therein.

A conventional cassette accommodating casing is shown in FIG. 1. Reference numeral 1 is a box type casing body for receiving or accommodating a tape cassette 4 having reel hubs 3, 3 rotatably mounted therein, on which a magnetic tape 2 is wound. The casing body 1 has a rectangular opening. A lid member 5 is rotatably attached to the casing body 1 at the minor side thereof for closing the opening. The lid member 5 is provided with projected engaging plate members 6 and 7 for preventing the reel hubs 3, 3 from rotating by engaging them with each other. The engaging plate members 6 and 7 are arranged at the same plane as the opening and closing direction of the lid 5 and comprise slanted portions 6*a*, 7*a* provided at the far away side (right side in FIG. 1) from a fulcrum A of the lid 5 and for making the reel hub 3 eccentric, and slanted portions 6*b*, 7*b* provided at the side near the fulcrum A (left side in FIG. 1) and for preventing engagement with a plurality of projected pins 3*a* which are provided at the inner peripheral surface of the reel hub 3.

If the engaging plate members 6 and 7 of the lid 5 opposite to the pair of reel hubs 3, 3 are projected with the same direction each other, as shown in FIG. 2 there are some cases where a pair of pins 3*a* are opposite to the engaging plate members 6 and 7. When the lid 5 is closed under such condition, the slanted portions 6*a* and 7*a* are engaged to the pins 3*a*, respectively, and at the same time the slanted portions 6*b* and 7*b* are engaged to the edge of the reel hubs 3, respectively, so that the engagement of the plate members 6 and 7 is prevented by the reel hubs 3 and thus the degree of freedom of the reel hubs 3 is obstructed. Particularly, in the tape cassette 4 for an automatic cassette receiving device, the engaging plate members 6 and 7 are depressed to the pin 3*a* under the condition that they are touched with each other until the lid 5 is fully closed, so that the pin 3*a* is chipped or broken.

SUMMARY OF THE INVENTION

It is an object of the present invention to overcome the above described disadvantage of the conventional cassette receiving casing.

It is another objected of the present invention to provide a cassette receiving casing in which a pair of engaging plate members each having a slanted portion for regulating reel hubs of a tape cassette and for making a central axis of the reel hub eccentric and a notched portion for preventing engagement to a pin of the reel hub, are provided to a casing body for receiving a tape cassette in such a manner that respective slanted portions are arranged opposite to each other on the same plane as the opening and closing direction of a lid member, thereby ensuring the degree of freedom of the reel hub and engagement of the plate member with the reel hub.

According to the present invention there is provided a casing for receiving a cassette comprising a casing body for receiving a tape cassette, the casing body having a rectangular opening, a lid member attached to the minor side of the opening and capable of being opened and closed, and a pair of engaging members provided to the lid and arranged at the same plane as the opening and closing direction of the lid and for regulating the position of reel hubs which are rotatably mounted to the cassette.

The engaging member has a slanted portion provided at the opposite position of the tip thereof and for making the central axis of the reel hub eccentric, and a notched portion provided at the opposite position to the slanted portion and for preventing engagement to projections which are formed at the inner peripheral surface of the reel hub. The lid member is attached to the major side of the rectangular opening. The engaging members are arranged at the same plane as the opening and closing direction of the lid.

BRIEF DESCRIPTION OF THE DRAWING

These and other feature and advantages of the present invention will become readily apparent from the following detailed description of one embodiment of the present invention, particularly when taken in connection with the accompanying drawings, wherein:

FIG. 3 is a perspective view showing an embodiment of a construction of a casing for receiving a cassette according to the present invention;

FIG. 4 is a longitudinal sectional view illustrating the cassette receiving casing shown in FIG. 3 under the condition of receiving the tape cassette therein;

DESCRIPTION OF THE PREFERRED EMBODIMENT

Figure 1:
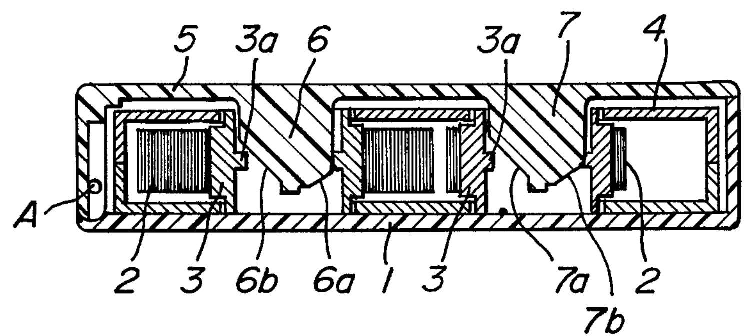
FIG. 1 is a longitudinal sectional view showing a construction of a conventional cassette receiving casing under the condition of receiving a tape cassette therein.
Figure 2:
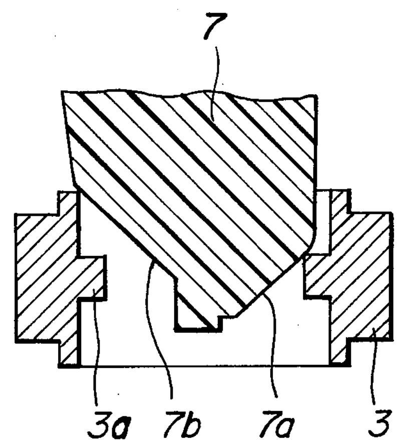
FIG. 2 is a partially longitudinal sectional view explaining the operation of the casing shown in FIG. 1.

Referring now to the drawing, there is shown an embodiment of a casing for receiving a cassette according to the present invention.

In FIG. 3 reference numeral 11 is a box type casing body formed in the same shape as the tape cassette. The casing body 11 has a rectangular opening 11*a*. A lid member 12 is rotatably attached to the minor side of the casing body 11 thereby closing the opening 11*a*. The lid member 12 is provided at the inner surface thereof with a pair of projected engaging plate members 13 and 14 for example rotation stopper plates for regulating the position of tape cassette. As shown in FIG. 4 the rotation stoppers 13 and 14 comprise at the tips thereof slanted portions 13*a* and 14*a* for making eccentric the central axis of reel hubs 16 and 17 which are rotatably mounted to a tape cassette 15, and notched portions 13*b* and 14*b* for preventing engagement to pins 16*a* and 17*a* of the reel hubs 16 and 17, respectively, in such a manner that respective slanted portions 13*a* and 14*a* of the rotation stoppers 13 and 14 are arranged opposite to each other on the same plane as the opening and closing direction of the lid member 12. In FIG. 4, reference numeral 18 is a magnetic tape wound on the reel hubs 16 and 17.

Figure 5A:
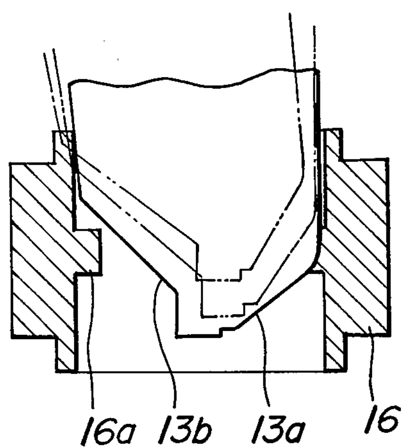
FIGS. 5*a* and 5*b* are partially longitudinal sectional views illustrating the operating locus of engaging plate members shown in FIGS. 3 and 4.
Figure 5B:
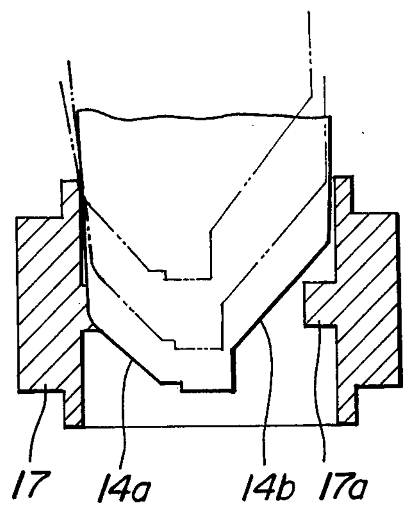
Figure 5C:
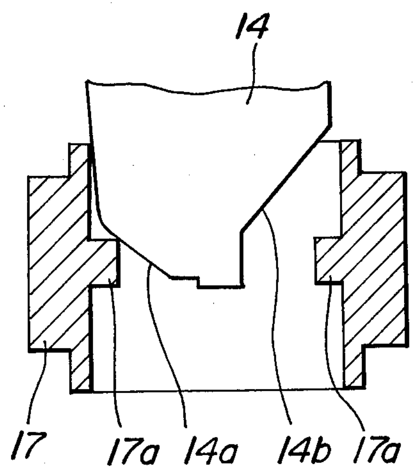
FIG. 5*c* is a partially longitudinal sectional view clarifying the relationship of the reel hub and the engaging plate members shown in FIGS. 3 and 4.

When the lid member 12 is closed under the condition that the tape cassette 15 is charged in the casing body 11, respective rotation stoppers 13 and 14 are engaged with the reel hubs 16 and 17 through dot and break line loci shown in FIGS. 5*a* and 5*b*. In this case when the lid member 12 is closed under the condition that a pair of pins are opposite to the rotation stopper 14 placed at the far away position from a fulcrum A of the lid member 12 as shown in FIG. 5*c*, the slanted portion 14*a* of the rotation stopper 14 is engaged to the left pin 17*a* while sliding the edge of the reel hub 17, and a gap is formed between the notched portion 14*b* and the reel hub 17, so that the reel hub 17 may be rotated by insertion force of the rotation stopper 14.

Therefore, according to such a construction even through a pair of pins 17*a* of the reel hub 17 are opposite to the rotation stopper 14, the slanted portion 14*a* and the notched portion 14*b* do not engage to the reel hub 17, simultaneously, so that the degree of freedom of the reel hub 17 can be ensured and the rotation stopper 14 can always be easily engaged with the reel hub 17. Particularly, in an automatic tape cassette charging device, the rotation stopper 14 does not depress on the reel hub 17 with strong force so that the pin 17*a* can not be chipped or broken and thus the reliability of the manufactured article can be improved.

It is further understood by those skilled in the art that the foregoing description is a preferred embodiment of the disclosed device and the present invention is not limited thereto and that various changes and modifications may be made in the present invention without departing from the spirit and scope thereof.

For example, the lid member can be attached to the major side of the rectangular casing body. In this case the rotation stopper may also be arranged at the same plane as the opening and closing direction of the lid member.

What is claimed is:

1. A case for receiving therein a tape cassette having a pair of spaced apart tape hubs with centrally located openings therein comprising:

a box member having an open top for receiving therein said cassette, and a first and a second pair of generally parallel opposed sides, said box member being shaped to receive said cassette in a position where said hubs are spaced apart in a direction extending parallel to said first pair of sides;

a cover for opening and closing said open top of said box member;

hinge means mounting said cover for pivotal movement to open and close said top of said box member along one of the sides of said second pair of sides; and a pair of engaging members mounted on the inner side of said cover positioned for engagement, respectively, within said openings in said tape hubs, one of said engaging members being located closer to said hinge means and the other of said engaging members being located further away from said hinge means;

said engaging members each being formed with a pair of opposed slanting surfaces, one surface each of said pair facing toward said hinge means and the other surface of each of said pair facing away from said hinge means;

with the slanting surface on said one engaging member facing toward said hinge means being steeper than the slanting surface facing away from said hinge means; and with the slanting surface on said other engaging member facing away from said hinge means being steeper than the slanting surface facing toward said hinge means.

2. A case for receiving therein a tape cassette having a pair of spaced apart tape hubs with centrally located openings therein comprising:

a box member having an open top for receiving therein said cassette, and a first and a second pair of generally parallel opposed sides, said box member being shaped to receive said cassette in a position where said hubs are spaced apart in a direction extending parallel to said first pair of sides;

a cover for opening and closing said open top of said box member;

hinge means mounting said cover for pivotal movement to open and close said top of said box member along one of the sides of said second pair of sides; and a pair of engaging members mounted on the inner side of said cover positioned for engagement, respectively, within said openings in said tape hubs, one of said engaging members being located closer to said hinge means and the other of said engaging members being located further away from said hinge means;

said engaging members each being formed with a pair of opposed slanting surfaces, one surface each of said pair facing toward said hinge means and the other surface of each of said pair facing away from said hinge means;

with the slanting surface on said one engaging member facing toward said hinge means extening relative to a line perpendicular to said cover at a smaller angle than the slanting surface facing away from said hinge means; and with the slanting surface on said other engaging member facing away from said hinge means extending relative to a line perpendicular to said cover at a smaller angle than said slanting surface facing toward said hinge means.

* * * * *